United States Patent [19]
Goto et al.

[11] Patent Number: 5,517,277
[45] Date of Patent: May 14, 1996

[54] BATTERY PACK

[75] Inventors: Tetsuro Goto, Funabashi; Hiroshi Hasegawa, Tokyo, both of Japan

[73] Assignee: Nikon Corporation, Tokyo, Japan

[21] Appl. No.: 352,891

[22] Filed: Dec. 9, 1994

[30] Foreign Application Priority Data

Dec. 10, 1993 [JP] Japan ..................................... 5-310487
Dec. 27, 1993 [JP] Japan ..................................... 5-330459

[51] Int. Cl.⁶ .................................. G03B 7/26; H02J 7/04
[52] U.S. Cl. ............................. 354/468; 354/484; 320/48
[58] Field of Search ..................................... 354/468, 484; 320/48

[56] References Cited

U.S. PATENT DOCUMENTS 5,164,761  11/1992  Isono et al. .............................. 354/468
5,406,266   4/1995  Mino et al. ............................ 320/48 X
5,455,499  10/1995  Uskali et al. .......................... 320/48 X

FOREIGN PATENT DOCUMENTS 4-44632  4/1992  Japan .
4-44633  4/1992  Japan .
5-249537  9/1993  Japan .

*Primary Examiner*—W. B. Perkey

[57]  ABSTRACT

A battery pack capable of being installed in an electric equipment comprises a first battery, an integrating circuit for integrating at least the amount of discharge from the first battery, and a second battery for supplying power to the integrating circuit, which is arranged separately from the first battery.

17 Claims, 6 Drawing Sheets

BATTERY PACK

BACKGROUND OF THE INVENTION

1. Field of the Invention

This invention relates to a battery pack which integrates the charging or discharging current generated when fed to an apparatus or charged by a charger, and then, calculates the remaining capacitance in accordance with the result of the integration.

2. Related Background Art

As a battery pack of the kind, there has been known the one disclosed in Japanese Utility Model Application Laid-open No. 4-44632. In conjunction with FIG. 1 to FIG. 3 which represent an embodiment of this invention, the description will be made of such a battery pack. FIG. 1 which illustrates a battery pack according to this invention corresponds to FIG. 3 of the above-mentioned Laid-Open Application. Likewise, FIG. 2 corresponds to FIG. 10, and FIG. 3 to FIG. 11. The AC power supplied through an AC plug 1 shown in FIG. 3 is converted to a direct current in a charging circuit 2, and supplied to a secondary battery pack 4 through terminals 3A and 3B. The terminals 3A and 3B are provided for the charging plug 5 and the charging jack 6 of the secondary battery pack 4.

The terminals 7 and 8 which are arranged on one end of the battery pack 4 abut upon the contact points (not shown) in the battery housing 10 of a camera 9, thus supplying the current Id discharged from the battery 11 to an exposure control circuit 12 in the camera 9.

A resistor 13 shown in FIG. 3 transforms a current flowing in the direction indicated by an arrow Ic into a voltage at the time of charging, and a current flowing in the direction indicated by an arrow Id into a voltage at the time of discharging, thus outputting it to a current detection circuit 14. The current detection circuit 14 identifies the direction of the current generated at the time of charging or discharging, and calculates the amount of current at that time of charging or discharging, thus outputting the result thereof into a calculating circuit 15. Also, to the calculating circuit 15, the output timing is applied from a timing circuit 16. In this way, the calculating circuit 15 obtains the value of the current capacitance of the battery 11 at that time by calculating the amount of current at the time of charging or discharging. The calculating circuit 15 works out the remaining capacitance of the battery 11 from the difference between the values of the current capacitance at the time of charging and that of discharging.

Here, the current detecting circuit 14, timing circuit 16, and calculating circuit 15 are fed from the battery 11 at all times through a constant voltage circuit 17. Then the value of the current capacitance thus obtained is indicated by a display means 18. Therefore, the user of the camera 9 can recognize the remaining capacitance of the battery 11 in it.

However, there are the problems given below in the secondary battery pack 4 disclosed in the Japanese Utility Model Application Laid-open No. 4-44632. As described above, the current detecting circuit 14, timing circuit 16, and calculating circuit 15 are fed at all times from the battery 11 through the constant voltage circuit 17. It is structured, therefore, that the power of the battery 11 is dissipated positively even when the battery pack 4 is left intact without being installed in the camera 9. If the battery pack is left as it is in such a state for a long time, the battery 11 is caused to discharge excessively. As well known, a nickel-cadmium battery which is used as a secondary battery is damaged most by an excessive current. Once it is damaged, the original capacity cannot be regained even if it is charged or the battery itself is destroyed, and there is a danger that it generates heat or brings about a liquid leakage when charged or discharged.

Further, in a terminating state of a battery pack 4 having a plurality of battery cells in it, there are invariably the cells among them that completely terminate the discharge earlier than others because of the individual variation of the cells. There is no problem if a charging takes place immediately even in this state, but if the battery is continuously left intact in this state, there occurs an inverted charging with respect to the above-mentioned cells by the discharged current from those cells which are yet to terminate discharging completely. It is also well known that the inverted charging produces adverse effects on a battery equally as in the excessive current. If the same process is taken when the battery is used after charging, the deterioration of the battery makes a further progress.

Not all the plural cells of a battery are given the damage described above at a time, but the damage takes place from the one cell whose condition is the worst. Therefore, even if the battery cells are packed with those having uniform characteristics, the probability of such a danger is higher for a battery pack having more cells.

SUMMARY OF THE INVENTION

It is an object of this invention to provide a battery pack capable of preventing the battery pack from causing an excessive discharge in order to eliminate its deterioration.

The structure of a battery pack whereby to attempt the achievement of this object will be described below using the reference numerals appearing in the embodiment disclosed in this application.

In a camera 9 in which a battery pack 4 can be detachably installed, the structure of the battery pack is formed by providing a first battery 11, an integrating circuit 15 for integrating at least the amount of discharge from the first battery 11, and a second battery 21 for supplying power to the integrating circuit 15, which is provided separately from the first battery 11.

With the structure described above, there is provided according to this invention the battery 21 separately from the aforesaid secondary battery 11 in order to supply the operational power to the integrating circuit 15 and others serving as a circuit to monitor the charging and discharging currents to and from the secondary battery 11 at all times. Therefore, even if the battery pack 4 is left intact, there is no possibility to invite the excessive discharge of the secondary battery 11.

In a camera 9 in which a battery pack 4 can be detachably installed, a structure is arranged to provide a first battery 11, an integrating circuit 15 for integrating at least the amount of discharge from the first battery 11, a voltage detection circuit 26 for generating a first signal by detecting the voltage of the first battery 11, and switching circuits 27, 25, and 26 for releasing the connection between the first battery 11 and the integrating circuit 15 when the first signal from the voltage detection circuit 26 becomes below a predetermined voltage.

With the structure as described above, it is arranged according to this invention that the voltage detection circuit 26 detects a predetermined voltage of the first battery 11, that is, a voltage before arriving at the state of an excessive discharging, and that the connection between the first battery 11 and the integrating circuit 15 is released by operating the switching circuits 27, 25, and 26. Therefore, the excessive discharge of the first battery 11 is not caused to make any progress after that.

DETAILED DESCRIPTION OF THE PREFERRED EMBODIMENTS

Figure 1:
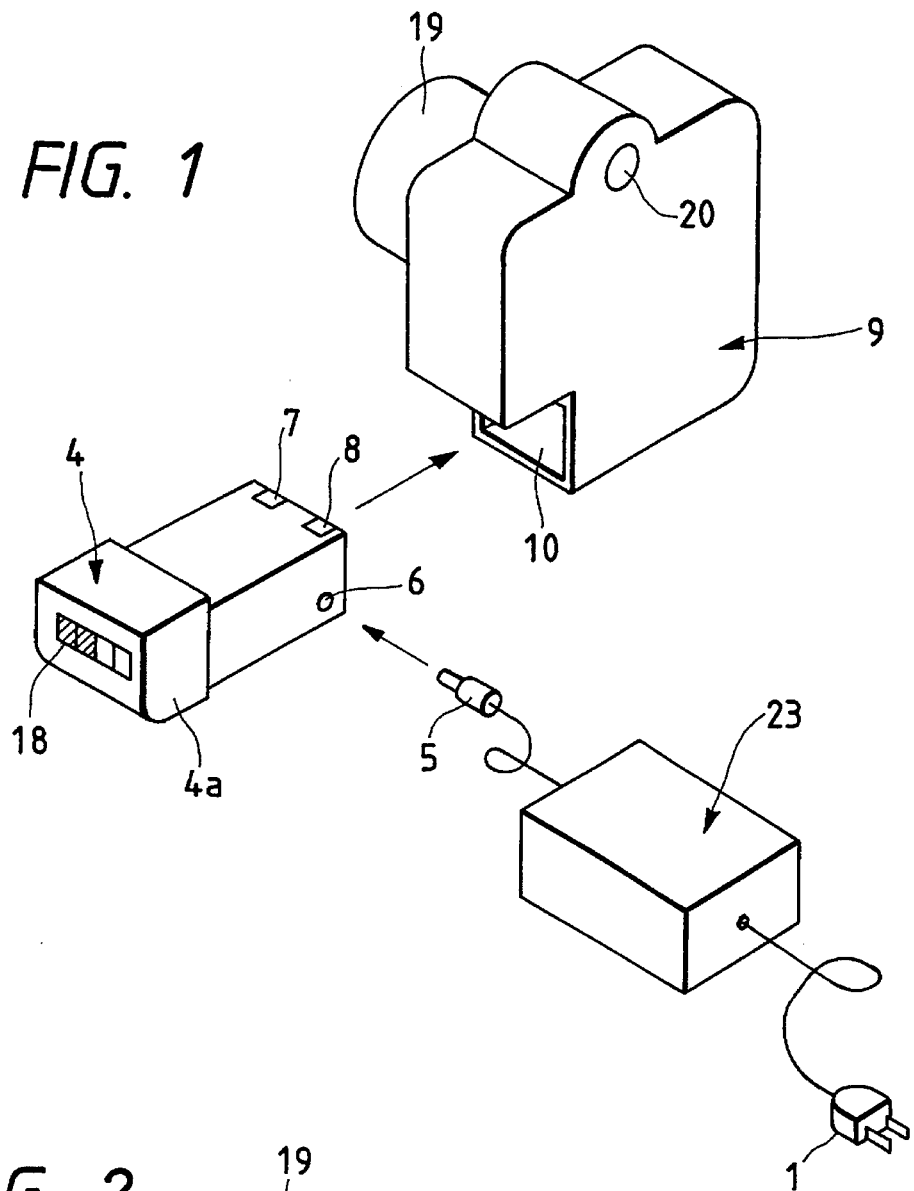
FIG. 1 is a development which shows the camera system according to the prior art, and at the same time, that of the camera system according to the present invention.
Figure 2:
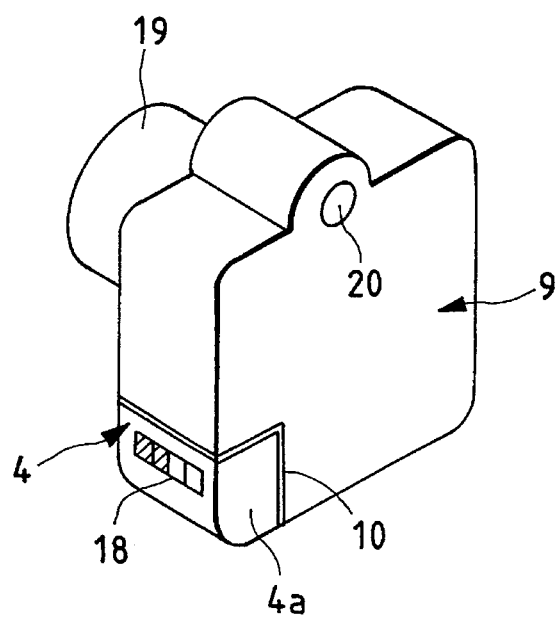
FIG. 2 is an external view which shows the camera system according to the above-mentioned prior art, and at the same time, that of the camera system according to the present invention.
Figure 4:
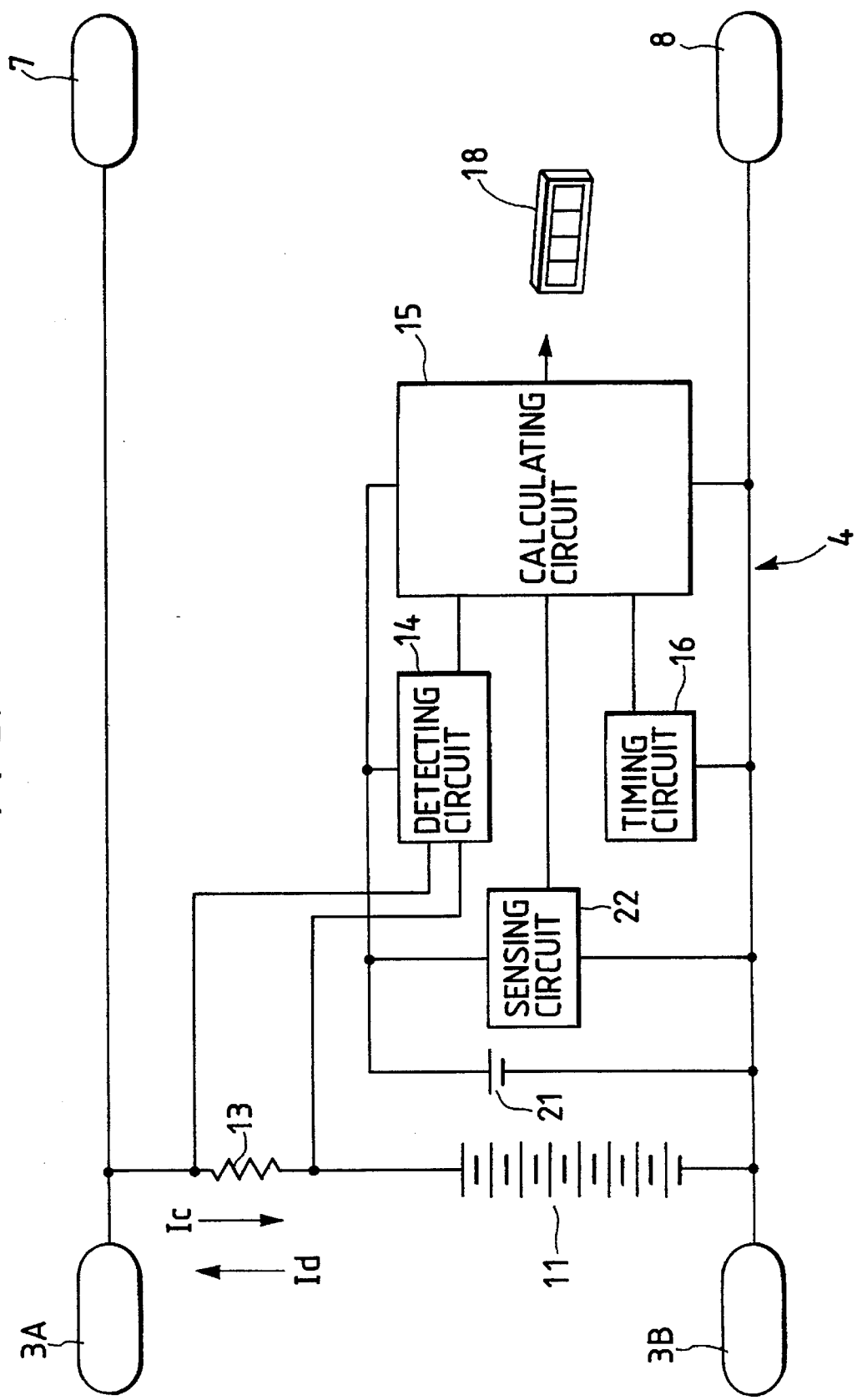
FIG. 4 is a view which shows a first embodiment according to the present invention.

FIG. 4 shows a first embodiment according to the present invention, and also, an electric circuit in a battery pack. FIG. 1 and FIG. 2 are a development and an external view representing a camera system according to the present invention. The camera 9 shown in FIG. 1 and FIG. 2 is provided with a photographing lens 19, and is arranged to expose a film when a shutter button (not shown) is depressed while confirming an object to be photographed through a finder 20. In the lower part of the camera 9, a housing 10 for receiving a battery pack (hereinafter referred to a housing) is provided. In the housing 10, a battery pack having in it a plurality of secondary batteries (nickel-cadmium batteries and the like, for instance), and a circuit for controlling charge and discharge, among others, is installed for use.

An electric circuit shown in FIG. 4 is the one which controls the charge and discharge. A resistor 13 shown in FIG. 4 is aimed at transforming the current flowing in or flowing out from a plurality of batteries 11 into a voltage in the same way as the prior art represented in FIG. 3. At the time of charging, the current flowing in the direction indicated by an arrow Ic is transformed into a voltage, while at the time of discharging, the current flowing in the direction indicated by an arrow Id is transformed into a voltage. The voltage thus transformed is transmitted to the current detection circuit 14. The current detection circuit 14 identifies the direction of current generated at the time of charge and discharge, and calculates the amount of current. The result thereof is output to a calculating circuit 15. Also, to the calculating circuit 15, the output timing is applied from a timing circuit 16. Therefore, the current integration, that is, the value of the current capacitance of the battery 11 at that time, is obtained by calculating the amount of the above-mentioned charge and discharge currents together with the applied timing.

In other words, it is possible to distinctly know the charging capacitance with respect to the battery 11 by the product of the charged current and charging time at the time of charging, and the discharging capacitance with respect to the battery 11 by the product of the discharged current and discharging time at the time of discharging. Thus the remaining capacitance of the battery 11 can be obtained by the difference between the former and the later.

Here, in order to obtain the absolute value of the remaining capacitance, there is known a method, among others, such that the circuit shown in FIG. 4 is connected to the battery 11 in a state that its capacity is known in advance or the numerical value in the calculating circuit 15 is reset to its initial value at the time of completion of charge or discharge.

Then, if the current capacity thus obtained is indicated on the LCD (Liquid Crystal Display) means 18 shown in FIG. 1 and FIG. 2 arranged on the side face of a holding unit 4a of the battery pack 4, it is possible for the user to recognize the remaining capacitance of the battery 11 in the interior of the camera.

Figure 3:
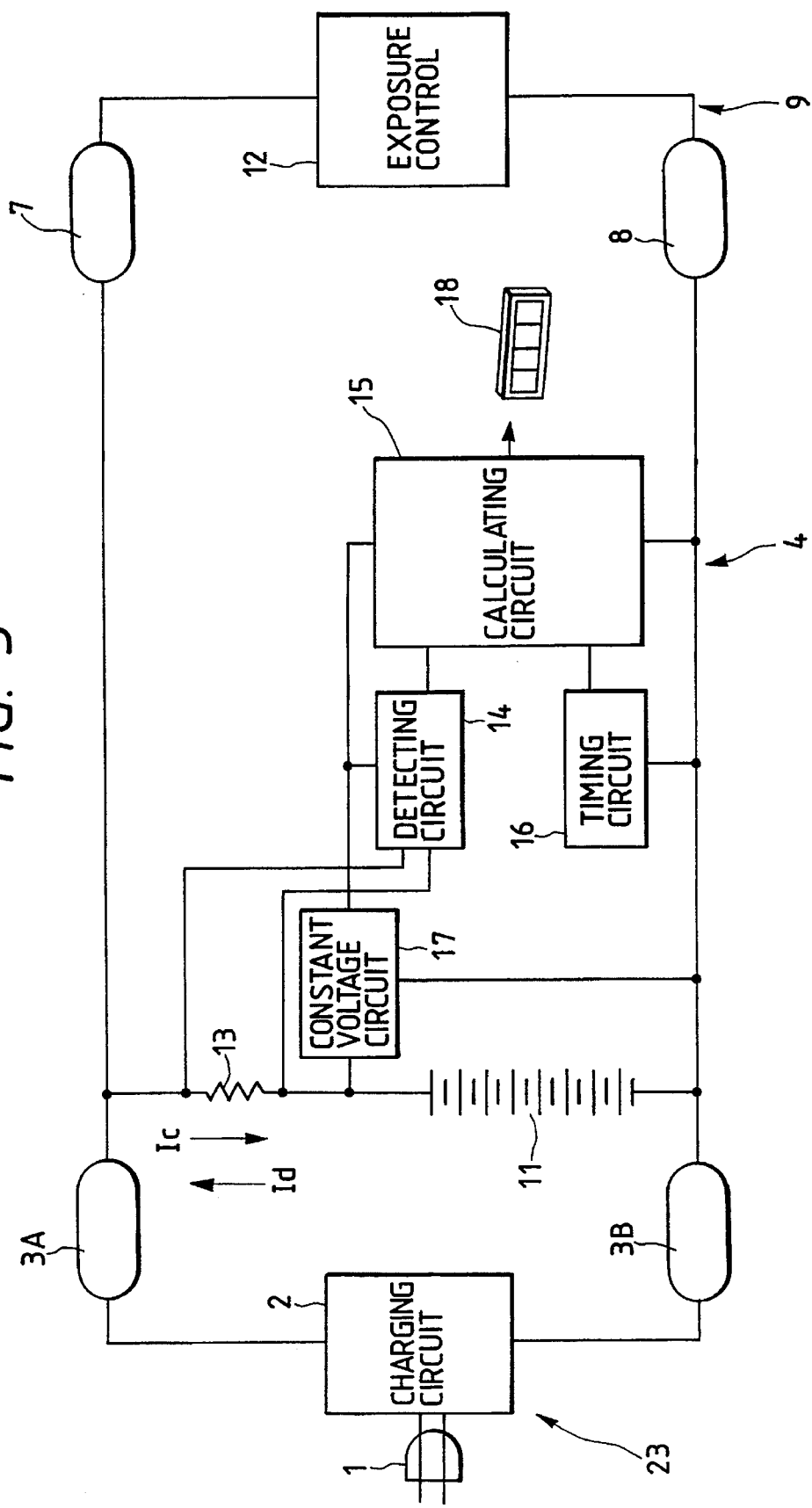
FIG. 3 is a circuit diagram which shows an example according to the above-mentioned prior art.

Here, this invention is different from the prior art described in FIG. 3 in that the power is supplied to the current detection circuit 14, timing circuit 16, and calculating circuit 15 from a buttery 21 which is separately arranged from the battery 11, and is dedicated to supplying power to these circuits.

The capacity of this battery 21 should only be made good enough to operate the above-mentioned circuits for several years. Also, the remaining capacitance is detected by the detection circuit 22. The signal carrying the remaining capacitance is output to the calculating circuit 15. Here, the calculating circuit 15 gives a warning through a display means 18 with respect to the battery 21 when its capacitance becomes insufficient before the battery 21 is disabled to supply power to operate the above-mentioned circuits.

Therefore, regarding the battery 11, only the current flows in or flows out in the direction indicated by the arrow Ic at the time of charging, and by the arrow Id at the time of discharging. In this way, it becomes unnecessary for the battery 11 to supply power to the current detection circuit 14, timing circuit 16, and calculating circuit 15 at all times. Consequently, the power of the battery 11 is not dissipated even when the camera 9 is left intact without installing the battery pack 4. Further, even if such state of intactness continues for a long time, the battery 11 is not caused to discharge excessively.

Moreover, since power is always supplied to the current detection circuit 14, timing circuit 16, and calculating circuit 15 from the battery 21, it is possible to indicate the remaining capacitance of the battery 11 on the display means 18 at all times.

Figure 5:
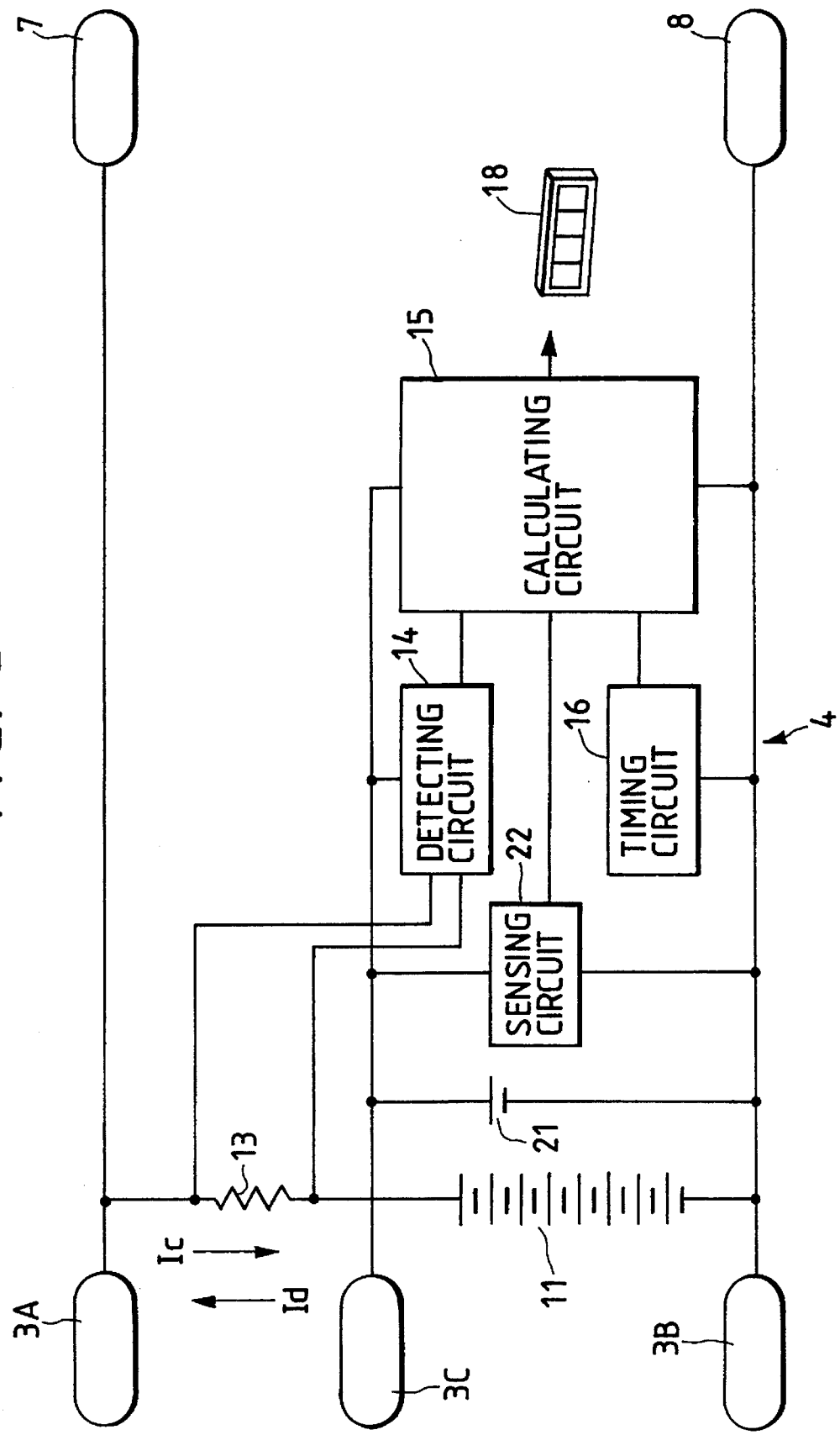
FIG. 5 is a view which shows a second embodiment according to the present invention.

FIG. 5 is a view which shows a second embodiment of the present invention, and represents the electric circuit in the battery pack. Also, as in the first embodiment, FIG. 1 and FIG. 2 are development and external views of a camera system according to the present embodiment. The circuit structure represented in FIG. 5 is the same as that shown in FIG. 4, but what differs therefrom is that a battery 21 represented in FIG. 5 is a rechargeable secondary battery whose circuit is structured in such a manner that it is charged at the same time that the battery 11 in the battery pack 4 is charged through the charging jack 6 of the charging plug 5 of the charger 23 shown in FIG. 1. In order to meet the requirements of the second embodiment, it is necessary for the charger 23 to provide in it a charging circuit dedicated to the battery 21 in addition to the charging circuit 2, and further, a terminal designated at 3C with respect to the charging plug 5 in addition to those terminals 3A and 3B.

As a result, regarding the battery 11, only the current flows in or flows out in the direction indicated by the arrow Ic at the time of charging, and by the arrow Id at the time of discharging. Also, regarding the battery 21, it is possible for the charging circuit which is dedicated to the use of the battery 21 to charge it when its capacitance is dissipated for the indication of the remaining capacitance of the battery 11 on the display means 18. Consequently, the display means 18 can be used at all times. Also, the remaining capacitance of the battery 21 is detected by the detection circuit 22, and then, the signal carrying the remaining capacitance is output to the calculating circuit 15. Here, when the battery pack 4 is charged, the calculating circuit 15 operates it to charge the battery 21 to the extent that the capacitance is dissipated by indicating the remaining capacitance of the battery 11 by means of the display 18.

Further, since the battery 21 is a rechargeable secondary battery, it is unnecessary to give a particular attention to the operational life due to the limited capacity as in the first battery. There is also no need for replacing the battery 21.

In this way, it is unnecessary for the battery 11 to supply power to the current detection circuit 14, timing circuit 16, and calculating circuit 15 at all times. Therefore, even if the camera 9 is left intact without installing the battery pack 4, the power of the battery 11 is not dissipated. Even when such state of intactness continues for a long time, the battery 11 is not caused to discharge excessively.

In this respect, it should be good enough only if a small primary battery of lithium is used for the above-mentioned second battery.

As described above, according to this invention, a structure is arranged to provide a secondary battery which supplies power to the integrating means. There is no need for the first battery to supply the power in this respect, thus making it possible to prevent the first battery from being deteriorated due to the fact that it is caused to discharge excessively.

Further, by making a second battery the chargeable secondary battery as in the second embodiment, it is possible to charge the capacitance of the secondary battery which is dissipated by indicating the remaining capacitance of the first battery on the display means, thus enabling the display means to be executable at all times. Further, it is unnecessary to give any particular attention to the operational life due to such a limited capacity as in the first battery. Hence there is no need for replacing the battery 21.

Figure 6:
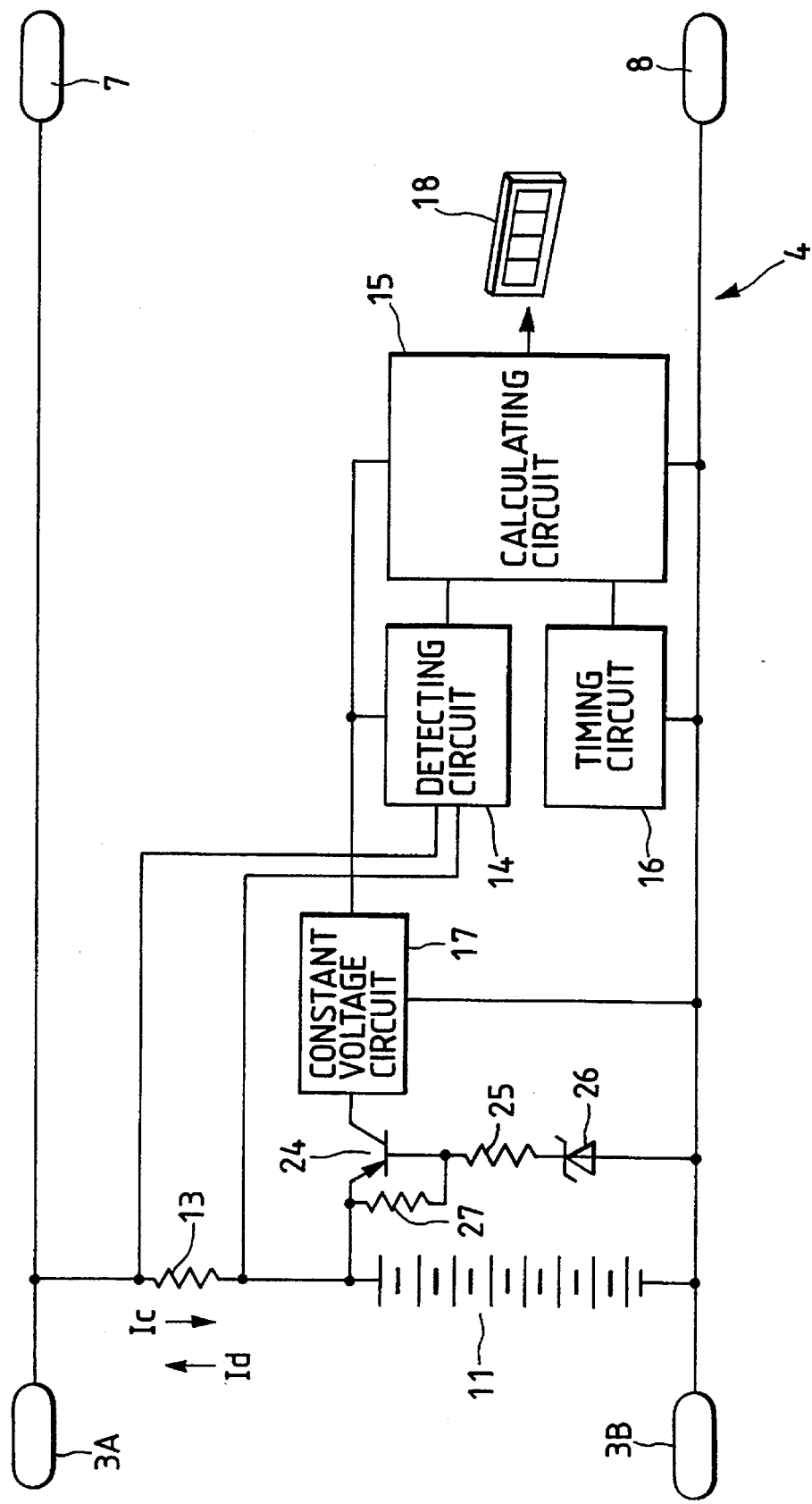
FIG. 6 is a view which shows a third embodiment according to the present invention, and a circuit diagram thereof.

FIG. 6 shows a third embodiment according to the present invention and represents the electric circuit in a battery pack.

According to the third embodiment, a power is supplied to the electric detection circuit 14, timing circuit 16, and calculating circuit 15 from a battery 11 through a constant voltage circuit 17.

Here, to the constant voltage circuit 17, a power is supplied from the battery 11 through a switching transistor 24. To the base of the transistor 24, a resistor 27 and a constant voltage diode 26 are connected in series. The resistor 27 is a resistor for removing the leaking component to the base of the transistor 24, and functions so that the transistor 24 is not turned on unpreparedly.

Here, for the constant voltage diode 26, a selection is carried out so as to make its output voltage substantially identical to the minimum operational voltage of the battery 11, that is, the voltage immediately before the battery arrives at a state that it is caused to excessively discharge.

According to this structure, the transistor 24 is turned on as far as the output voltage of the battery 11 maintains the voltage generated by the constant voltage diode 26, that is, a voltage good enough to enable the current detection circuit 14, timing circuit 16, and calculating circuit 15 to be driven through the constant voltage circuit 17. Consequently, it is possible to continuously integrate the remaining capacitance of the battery 11. The remaining capacitance of the battery 11 is indicated on the display means 18.

On the contrary, if the discharge of the battery 11 advances and arrives at a voltage which is not good enough to drive the above-mentioned circuits, the transistor 24 is automatically turned off to function so that any more discharging of the battery 11 is prohibited. Here, since the transistor 24 is turned off, the LCD segments of the display means 18 which have indicated the remaining capacitance of the battery 11 thus far are no longer illuminated because the function of the calculating circuit 15 is suspended. Therefore, from the fact that these segments are no longer illuminated, it is known that the connection between the battery 11 and the calculating circuit 15 is released, thus making it possible to confirm the status of the capacitance of the battery 11.

FIGS. 7A to 7D are the examples which illustrate the states of the capacitance of the battery 11 each being indicated on the display means 18.

Figure 7A:
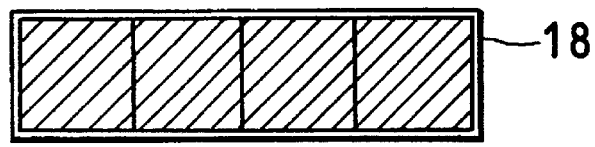
FIGS. 7A to 7D are views which show a third embodiment according to the present invention, and also, examples of display.

FIGS. 7A shows a state where the remaining capacitance of the battery 11 is from 75% to 100%, and thus, the prepared LCD segments are all illuminated.

Figure 7B:
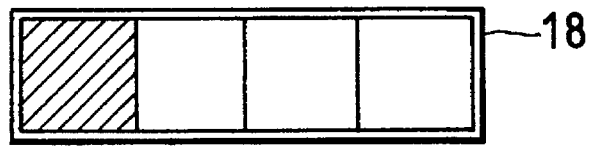

FIG. 7B shows a state where the remaining capacitance is reduced to 25% or less, thus illuminating only a ¼ of the segments.

Figure 7C:
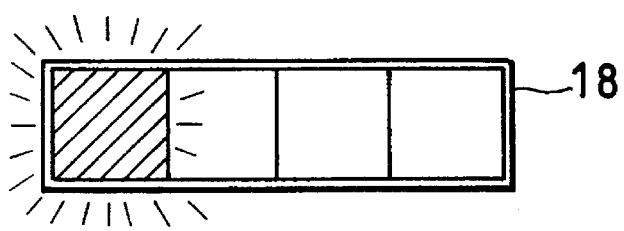

FIG. 7C shows a state where the remaining capacitance arrives at 0%. Thus a ¼ of the segments illustrated in FIG. 7B blinks to prompt a recharging.

Figure 7D:
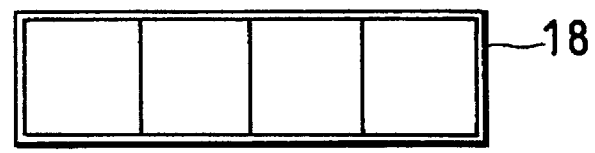

FIG. 7D illustrates a state where the status shown in FIG. 7C further advances and arrives at a state of excessive discharging, thus causing the aforesaid transistor 24 to be turned off. As a result, the function of the calculating circuit 15 is suspended so that no segments are illuminated.

In this respect, according to the present embodiment of this invention, the first battery is formed by a nickel-cadmium battery, but it is not necessarily limited thereto. It is possible to obtain the same effects by use of a lead storage battery, nickel-hydrogen battery or some other secondary battery.

Further, according to the present embodiment of this invention, while the description is made of an indication in the constant mode provided by means of display using LCD, it is not necessarily limited thereto. It may be possible to apply the display means which is structured by use of light emitting diode array or the like so that the display can be made whenever a button is depressed for illumination.

Moreover, according to the present embodiment of this invention, the battery pack is for use of a single-lens reflection camera, but it is not necessarily limited thereto. The battery pack of this invention is applicable to a lens shutter camera, a video camera, and an equipment which uses an external battery pack.

As described above, in a camera in which a battery pack is detachably installed, a structure is arranged according to this invention to enable a voltage detection circuit to detect a voltage so that switching circuits can be operated before the first battery presents a state of excessive discharge, and then, the connection between the first battery and an integrating circuit is released. Therefore, it is possible to prevent the first battery from being caused to excessively discharge because of the continued connection between the battery and the integrating circuit. Further, this prevention of the excessive discharging of the first battery makes it possible to effectively preventing the first battery from being deteriorated.

What is claimed is:

1. A battery pack capable of being installed in an electric equipment, including the following:

a first battery;

an integrating circuit for integrating at least the amount of discharge from said first battery; and a second battery for supplying power to said integrating circuit, said second battery being provided separately from said first battery.

2. A battery pack according to claim 1, wherein said electric equipment is a camera.

3. A battery pack according to claim 1, wherein said battery pack is attachable to and detachable from said electric equipment.

4. A battery pack according to claim 1, wherein said first battery is a secondary battery, and said integrating circuit is provided with a function to integrate the amount of charging with respect to said first battery.

5. A battery pack according to claim 1, wherein said second battery is a primary battery.

6. A battery pack according to claim 1, wherein said first battery is a secondary battery, and said second battery is a secondary battery, and also, it is charged when said first battery is charged.

7. A battery pack according to claim 1, further including:

display means for displaying the battery capacitance of said first battery by the output of said integrating circuit.

8. A battery pack according to claim 7, wherein said display means displays the result of integration of said first battery in accordance with the output of said integrating circuit.

9. A battery pack according to claim 7, wherein said display means displays the battery capacitance of said second battery.

10. A battery pack according to claim 7, wherein said display means displays at least either one of the battery capacitances of said first and second batteries.

11. A battery pack capable of being installed in an electric equipment, including the following:

a first battery;

an integrating circuit for integrating at least the amount of discharge from said first battery;

a voltage detection circuit for generating a first signal by detecting the voltage of said first battery;

a switching circuit for releasing the connection between said first battery and said integrating circuit when said first signal of said voltage detection circuit becomes lower than a predetermined voltage.

12. A battery pack according to claim 11, wherein said electric equipment is a camera.

13. A battery pack according to claim 11, wherein said battery pack is attachable to and detachable from said electric equipment.

14. A battery pack according to claim 11, wherein said switching circuit is provided between said first battery and said integrating circuit.

15. A battery pack according to claim 11, wherein said first battery is a secondary battery, and said integrating circuit is provided further with a function to integrate the amount of charging with respect to said first battery.

16. A battery pack according to claim 11, further including the following:

display means for displaying the battery capacitance of said first battery in accordance with the output of said integrating circuit.

17. A battery pack according to claim 16, wherein said display means is provided with a function to notify releasing whereby to notify that the connection between said first battery and said integrating circuit is released.

* * * * *